US012291050B2

(12) United States Patent
De Roeck

(10) Patent No.: US 12,291,050 B2
(45) Date of Patent: May 6, 2025

(54) METHOD OF DECORATING NATURAL LEATHER

(71) Applicant: AGFA NV, Mortsel (BE)

(72) Inventor: Luc De Roeck, Mortsel (BE)

(73) Assignee: Agfa NV, Mortsel (BE)

( * ) Notice: Subject to any disclaimer, the term of this patent is extended or adjusted under 35 U.S.C. 154(b) by 212 days.

(21) Appl. No.: 18/248,115

(22) PCT Filed: Oct. 5, 2021

(86) PCT No.: PCT/EP2021/077383
§ 371 (c)(1),
(2) Date: Apr. 6, 2023

(87) PCT Pub. No.: WO2022/073971
PCT Pub. Date: Apr. 14, 2022

(65) Prior Publication Data

US 2023/0364933 A1 Nov. 16, 2023

(30) Foreign Application Priority Data

Oct. 8, 2020 (EP) .................................... 20200747

(51) Int. Cl.
*B41M 5/00* (2006.01)
*B41J 3/407* (2006.01)
*B41J 11/00* (2006.01)

(52) U.S. Cl.
CPC ............ *B41M 5/0076* (2013.01); *B41J 3/407* (2013.01); *B41J 11/0085* (2013.01); *B41M 5/0047* (2013.01)

(58) Field of Classification Search
CPC .... B41M 5/0076; B41M 5/0047; B41J 3/407; B41J 11/0085; B41J 11/007; D06P 3/32; D06P 5/30; C14B 1/56
See application file for complete search history.

(56) References Cited

U.S. PATENT DOCUMENTS

2016/0067984 A1 3/2016 Chung
2019/0270320 A1* 9/2019 De Roeck ................ B41J 3/407

FOREIGN PATENT DOCUMENTS

KR 2017-0143170 A 12/2017
WO WO 2001/032434 A1 5/2001
(Continued)

OTHER PUBLICATIONS

European Patent Office, International Search Report in International Patent Application No. PCT/EP2021/077383, mailed Feb. 18, 2022, 3 pp.
(Continued)

*Primary Examiner* — Justin Seo
*Assistant Examiner* — Tracey M McMillion
(74) *Attorney, Agent, or Firm* — Leydig, Voit & Mayer, Ltd.

(57) ABSTRACT

Method of decorating natural leather with an inkjet printer which comprises: —a first vacuum belt (150) for conveying an unwoven fabric (200) which is configured as a second vacuum belt, for conveying under an inkjet print head (505) a natural leather (300); and wherein the method comprises: —applying from an adhesive tape-roll an adhesive tape (1300) as a continuous sheet against the unwoven fabric wherein said adhesive tape (1300) has an adhesive side and opposite side and the opposite side is in contact with the unwoven fabric; —applying a natural leather (300) on the adhesive side of the adhesive tape (1300); —conveying the applied natural leather by moving the first vacuum belt (150) whereby the unwoven fabric (200) is moving by suction power through the first vacuum belt (150) and the applied adhesive tape (1300) is moving by said suction power through said unwoven fabric (200) under an inkjet print head (505); —marking the applied natural leather with jetted droplets of the inkjet print head (505) for decorating said
(Continued)

natural leather while the adhesive tape (1300) is attached to the unwoven fabric (200).

15 Claims, 4 Drawing Sheets

(56) References Cited

FOREIGN PATENT DOCUMENTS

| | | |
|---|---|---|
| WO | WO 2018/087119 A1 | 5/2018 |
| WO | WO 2019/042952 A1 | 3/2019 |

OTHER PUBLICATIONS

European Patent Office, Written Opinion in International Patent Application No. PCT/EP2021/077383, mailed Feb. 18, 2022, 5 pp.

* cited by examiner

METHOD OF DECORATING NATURAL LEATHER

CROSS-REFERENCE TO RELATED APPLICATIONS

This patent application is the U.S. national stage of copending International Patent Application No. PCT/EP2021/077383, filed Oct. 5, 2021, which claims the benefit of European Patent Application No. 20200747.2, filed Oct. 8, 2020.

TECHNICAL FIELD

The present embodiment relates to the manufacturing of decorated natural leather by an inkjet printer.

BACKGROUND ART

The manufacturing of natural leather articles is well known and can generally be split up in five phases. The preparatory phase 1 often occurs partly in a slaughterhouse and partly in a tannery, while phases 2 to 4 occur in the tannery and phase 5 occurs at a leather article manufacturer. In a first phase, the preparatory phase, the skin is removed from the animal (flaying) and pre-treated for the second phase of tanning. The pre-treatment may involve processes such as soaking, liming, unhairing, splitting and pickling (adjusting pH for assisting penetration of tanning agents). In the tanning phase, the protein of the rawhide or skin is converted into a stable material that will not putrefy. Chrome is most frequently used as tanning agent wherein the tanned product obtains a pale blue colour, therefore commonly called “Wet blue”. In the third phase of crusting, the tanned leather is dried and softened. The crusting often includes processes such as stripping (removal of superficially fixed tannins), fat liquoring (fats, oils and waxes are fixed to the leather fibres), dyeing, whitening, physical softening, and buffing (abrasion of leather surface to reduce grain defects). In the fourth phase, called the finishing phase, the leather is made ready for sale to leather article manufacturers. Finishing operations may include lacquer coating, polishing and embossing. In the fifth phase, a leather article is manufactured, involving processes, which may include cutting, perforating, sewing, leather wrapping, decoration and embossing.

Natural leather has been decorated in the past by screen printing. However, screen printing is labour intensive as for each colour an individual screen is required. This is costly and time consuming, especially when personalization or customization is desired.

Digital printing technologies on finished leather have been investigated but many solutions on finished leather remain of inferior quality. Inkjet technologies from textile printing employing heat transfer paper have been explored for leather printing. However just like inkjet printing directly onto natural leather, it was found that a process of inkjet printing dye-based images onto a sheet of transfer paper and then transferring the images onto tanned leather by heat resulted in a quality unacceptable for many luxury leather products. Examples of such inkjet processes are disclosed in WO01/32434 A (GILHAM) and US 2016067984 A (CHUNG).

WO2019042952 (AGFA NV) discloses several methods of clamping natural leather on a support for decorating said natural leather by an inkjet printing method. Another way of holding down natural leather is disclosed in KR20170143170 (CHAE MYUNG SUK) wherein a sheet is used to transport and support the natural leather in an inkjet printer.

The handling of natural leather on a support of an inkjet printer is not easy due to forces between intertwined fibres of said natural leather. Said forces cause wrinkles, even while printing, and said wrinkles result in regular collisions with the print heads of said printer. Also the tufted corium side makes the handling on a support not easy. Enlarging the throw distance may overcome said collisions but this results in blurry inkjet printed decorative images. A vacuum support may help flattening the natural leather but said forces and the fibrous and tufted corium side (370), results in uncontrolled holding of said leather against the vacuum support, especially at the edges of said natural leather.

In the preparation of the natural leather at the input side of the inkjet printer the natural leather needs sufficient support. The same counts also at the output side of the inkjet printer. Said heavy natural leather may have large dimensions or there is a need for a fast production of a plurality of decorated panels. A vacuum belt with high precision transport and enough stiffness can then become very expensive because said vacuum belt and thus also vacuum table shall have a large length for arranging said large natural leather or plurality of panels at the input side and also for removing said leathers at the output side of the inkjet printer. This makes that the cost of manufacturing such inkjet printer is high when the speed accuracy/step accuracy still needs to be very high for precise printing and achieving high print quality.

Hence, there is a need for obtaining a reliable inkjet printer for performing an efficient and faster method for manufacturing high quality decorating natural leather wherein the method avoids collisions against expensive print heads and easy mounting of the natural leather in the inkjet printer and this for all kind of natural leathers such as leathers from cow skin, goat skin, snake skin . . . which have all different kind of corium sides that have to be attached on the inkjet printer.

SUMMARY OF INVENTION

In order to overcome the problems described above, preferred embodiments of the present invention have been realised with a method of decorating natural leather with inkjet technology according to claim 1.

The present invention may be part of a manufacturing line for decorated natural leather, wherein said manufacturing line may comprise other decoration techniques such as cooling, air-blowing, embossing, laser ablating, laser marking, top coating . . . and it may comprise post print techniques such as cutting, folding, perforating and sewing. An object of the present invention is thus also a manufacturing method for decorated natural leather.

The present embodiment is performed by an inkjet printer which comprises two vacuum belts:

- a first vacuum belt (150) for conveying a second belt which is suitable for conveying under an inkjet print head (505) a tape whereon a natural leather is applied. Said inkjet print head (505) is for printing an image on said natural leather as decoration or even as identification.

Said second belt is in the present embodiment a vacuum belt and more preferably an unwoven fabric (200) configured as vacuum belt and most preferably a felt configured as vacuum belt.

WO2018/087119 (AGFA NV) discloses a comparable inkjet printer with such 'twin belt system'.

The present embodiment is a method of decorating natural leather which comprises:

- applying from an adhesive tape-roll an adhesive tape (1300), preferable as a continuous sheet, against the unwoven fabric wherein said adhesive tape (1300) has an adhesive side and opposite side and the opposite side is in contact with the unwoven fabric;
- applying a natural leather (300) on the adhesive side of the adhesive tape (1300);
- conveying the natural leather by moving the first vacuum belt (150) whereby the unwoven fabric (200) is moving by suction power through the first vacuum belt (150) and the applied adhesive tape (1300) is moving by said suction power through said unwoven fabric (200) under an inkjet print head (505);
- marking the applied natural leather with jetted droplets of the inkjet print head (505) for decorating said natural leather while the adhesive tape (1300) is attached to the unwoven fabric (200).

The adhesive tape in the present invention has a thickness between 0.01 mm and 0.50 mm, preferably between 0.02 mm to 0.2 mm. Said adhesive tape needs some hard support for applying the natural leather flat. Said support is provided by said second vacuum belt. Applying the adhesive tape directly on the first vacuum belt while not using said second conveyor belt, the adhesive tape is sucked in the air holes of said first vacuum belt which gives a bad flatness of an applied natural leather.

The use of said second vacuum belt results in a cheap system with enough stiffness for applying the adhesive tape and the natural leather, even the second vacuum belt is not supported on the first vacuum belt at the input side of the inkjet printer where a plurality of panes can be applied or where one or more applied natural leather (s) can be scanned for knowing their contour and/or defects. Also at the output side, post processing on decorated natural leather may be performed while one or more decorated natural leathers or supported on said adhesive tape and second vacuum belt, even the second vacuum belt is not supported on the first vacuum belt.

The one or more natural leathers are hereby preferably pressed against the adhesive side of the adhesive tape (1300) by a pressing device. Said pressing device preferably comprises a portion for traversing said natural leather (300) with a rub by a relative movement between said pressure device and said adhesive tape (1300), carrying said natural leather (300). The portion traverses hereby a side of the natural leather wherein it moves along the surface of said side with pressure (=rub) during a period.

The unwoven fabric (200) has preferably an air permeability below 90 L/(dm$^2$xmin) or more preferably below 70 L/(dm$^2$xmin) and above 5 L/(dm$^2$xmin). Using felt as unwoven fabric (200) is hereby found as good material whereby the adhesive tape (1300), including its edges, remains attached to the unwoven fabric (200) by vacuum power.

The unwoven fabric (200) may have a sticky layer for additional adhering the opposite side of the adhesive tape (1300) on said unwoven fabric (200) and/or the adhesive tape (1300) comprises also a sticky layer on its opposite side for additional adhering the opposite side of the adhesive tape (1300) on said unwoven fabric (200). Such adhesive tape is sometimes called double sided adhesive tape.

The unwoven fabric (200) is air-permeable on itself so there is no need for additional perforations. The air permeability of the unwoven fabric (200) is preferably below 90 L/(dm$^2$xmin).

It is further found that a felt as unwoven fabric (200) gives the best results for holding down the adhesive tape, while supporting the natural leather, against said felt. The felt preferably has no sticky layer because there is no need for and this results in glue contamination on the adhesive tape. The felt is preferably polyester felt.

These and other objects of the present invention will become apparent from the detailed description hereinafter.

BRIEF DESCRIPTION OF DRAWINGS

In FIG. 2 is the unwoven fabric (200) wrapped around an upstream gliding support (805) and a downstream gliding support (807). In FIG. 3 and FIG. 4 is the unwoven fabric (200) wrapped around a plurality of pulleys (815, 817).

In FIG. 4 extra features are added to a preferred embodiment of the inkjet printer: a media set bar (600), camera-system (1004) and a cutter (1005) and a regulator (1008) for guiding the second conveyor belt. The media set bar (600) comprises also a pinch roll to hold down a leather against the adhesive tape.

In FIG. 7 an image (305) is inkjet printed on the natural leather (350). The unwoven fabric (200) consists herein by one fibrous layer.

DESCRIPTION OF EMBODIMENTS

Natural Leather

Figure 1:
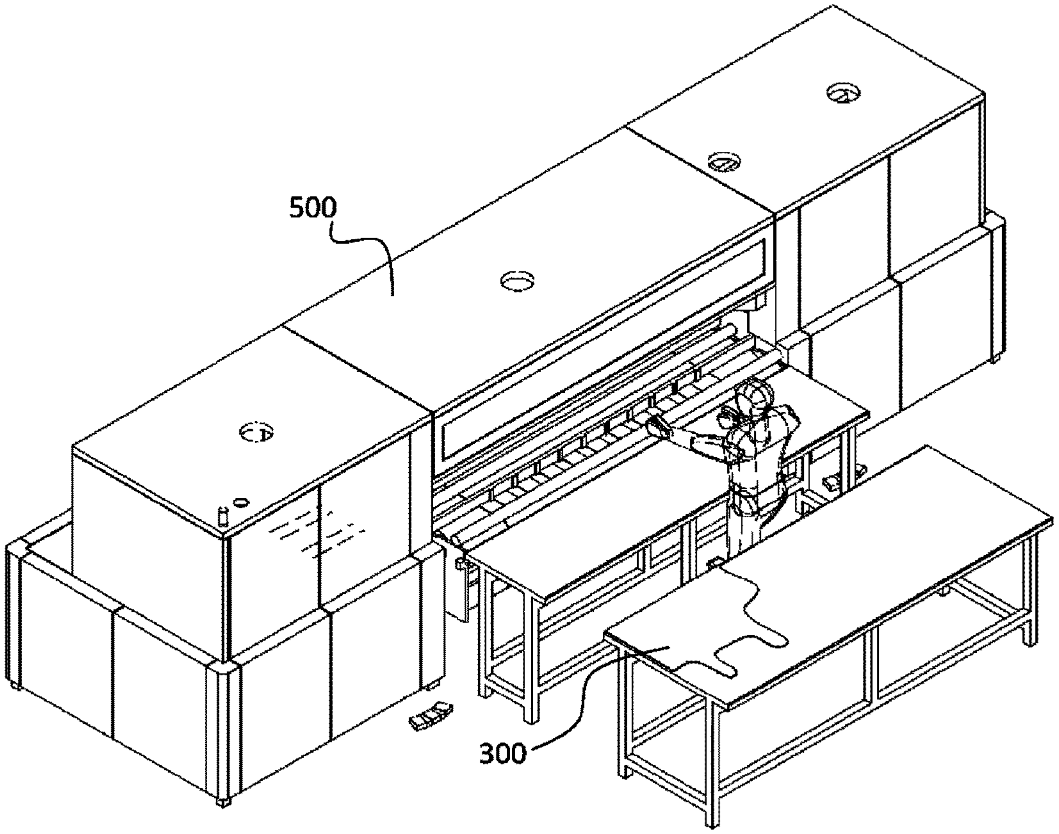
FIG. 1 illustrates an inkjet printer (500) adapted according the present invention for inkjet printing on natural leather (300). Said inkjet printer illustrates a TAURO™ from manufacturer AGFA NV.
Figure 2:
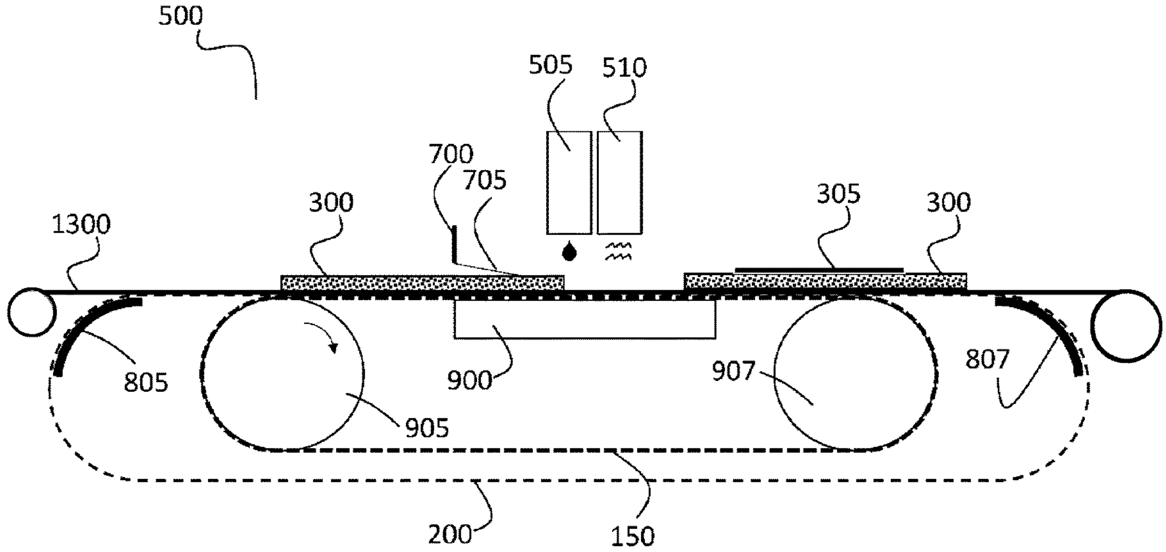
FIG. 2, FIG. 3 and FIG. 4 illustrate a cross-cut from preferred embodiments of the present invention wherein a print head (505) of an inkjet printer (500), not viewed, prints an image (305) and a dryer (510) dries said image (305) on natural leather (300). Said natural leather is conveyed on an adhesive tape (1300) which is supported on an unwoven fabric (200), configured as a vacuum belt. Said unwoven fabric (200) is conveyed by another vacuum belt (150). Said other vacuum belt (150) is wrapped around an upstream pulley (905); downstream pulley (907) and a vacuum table (900). The conveying of the natural leather (300) for printing goes from left to right as illustrated by the arced arrow. The natural leather (300) is pressed on the unwoven fabric (200) by a pressure device (700) having a portion (705), here illustrated as flat portion.
Figure 3:
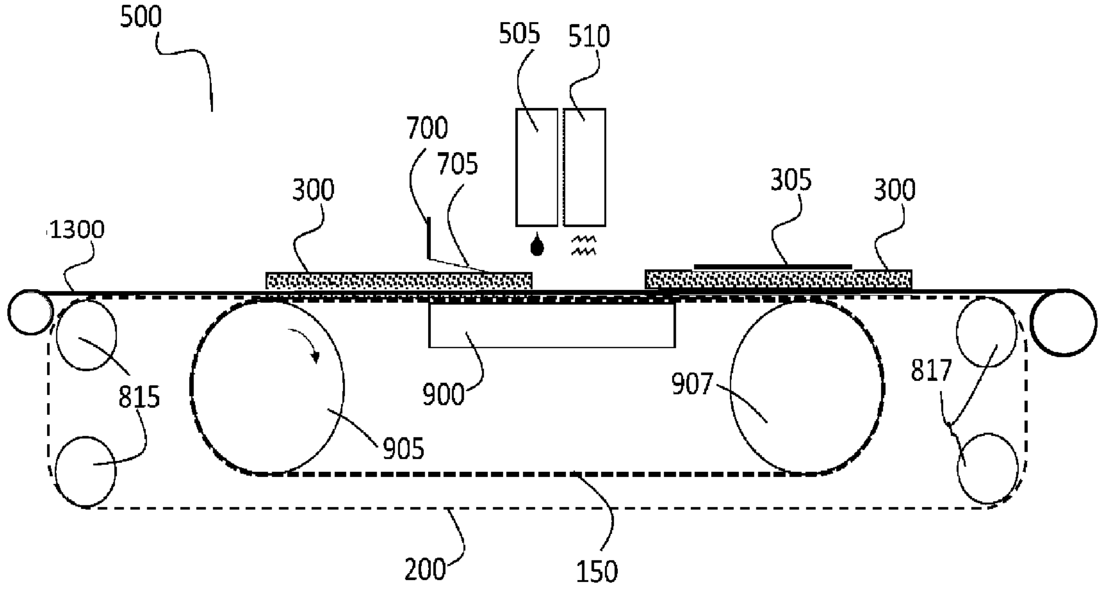

On a Jeti Tauro™, manufactured by AGFA NV, troubles were found for mounting natural leather (300) directly on its vacuum belt because of insufficient suction of vacuum power in this printing device and because of difficulties for avoiding wrinkles which crashes against a print head (505) of this printing device. The present embodiment is a solution for it by extending said printing device with an unwoven fabric (200), configured as second vacuum belt and the application of an adhesive tape (1300) on said unwoven fabric (200), which is hold down by vacuum power. The natural leather (300) is applied on said adhesive tape (1300) which is the result of unwinding a tape roll.

Natural leather (300) comes in different grades such as full grain, top grain which is essentially full-grain but with part of the grain layer sanded and the underlying split layer removed, and split leather. For the latter, the underlying layer of the hide is removed and used to create split leather. Depending on the thickness of the underlying layer, many splits can be created. Split leather has a rough appearance and is usually used to make suede.

The natural leather (300) has in the present embodiment two sides a corium side (370) and a grain side (350). Said corium side (370) is preferably the side in contact with the adhesive side of the adhesive tape (1300) and said grain side (350) is the side whereon an image is printed.

For preventing grain damage and weakness, a hide or skin is tanned preferably by chrome, but other tanning methods such as vegetable tanning may also be used. After tanning, the leather is dried and softened into so-called crusted leather. The crusting may include processes such as stripping (removal of superficially fixed tannins), fat liquoring (fats, oils and waxes are fixed to the leather fibres), dyeing, whitening, physical softening, and buffing (abrasion of leather surface to reduce grain defects). The natural leather (300) of the present embodiment is preferably such crusted leather. But it may also be a rawhide, which is an animal skin removed from an animal. The animal skin is not be tanned; or a tanned hide, which is a rawhide that is tanned in a tannery. It is also called tanned natural leather or shortly tanned leather;

The hide may also be a part of a hide such as butt, belly, neck, leg, shoulder. The hide may also be full grain leather, top grain leather or split leather.

The natural leather (300) of the present embodiment may also a hide cut for manufacturing leather articles. Said hide cut is also called a panel.

The Inkjet Printer

The present embodiment is performed by an inkjet printer (500) but it may also by any other printing device. Said printing device marks a pattern on a surface of a natural leather (300) such as on the grain side (350) of the natural leather (300). The marking of a pattern on a surface is also called printing. The pattern represents an image which may be text, photograph, graphic or logo. The pattern is mostly the result of a halftoning method of the image such as an error-diffusion method or an amplitude modulation halftoning method. The pattern may have an achromatic or chromatic color. By printing a pattern on a natural leather, the natural leather is decorated.

The input side of the inkjet printing device is the side where the natural leather is applied on the adhesive tape and the output side of said inkjet printing device is the side (after printing or post-treatment) said natural leather is removed from said adhesive tape.

The marking of the printing device may be done by any conventional printing technology such as offset printing, gravure printing, letterpress printing, screen printing. These conventional printing methods are all described in 'Chapter 2. Printing Technologies With Permanent Printing Master', P204-448 in 'Handbook of Print Media, Technologies and Production Methods' by Helmut Kipphan, ISBN 3-540-67326-1 Springer-Verlag Berlin Heidelberg New York, 2001. Such printing device is also called a conventional printing device.

Preferably the printing device in the present embodiment is a digital printing device such as an electrophotography-based, devices, iconography-based, magnetography-based, inkjet-based printing device. A digital printing device is sometimes called a printer and an inkjet-based printing device is sometimes called an inkjet printer (500). These digital printing methods are all described in 'Chapter 4. Printing Computer to . . . Technologies', 'Subchapter 4.5 Computer to Print", P657-674, and 'Chapter 5. Printing Technologies without a Printing Plate (NIP Technologies)', P676-758 in 'Handbook of Print Media, Technologies and Production Methods' by Helmut Kipphan, ISBN 3-540-67326-1 Springer-Verlag Berlin Heidelberg New York, 2001. The printing device may be a hybrid printing device wherein conventional printing technologies and digital and/or non-impact printing technologies are combined in a printing device.

A preferred printing technology for the present embodiment is thus an inkjet printing technology. The printing device from the present embodiment is thus preferably an inkjet printer (500) which is a printing device comprising an inkjet print head (505). The inkjet technology may be continuous inkjet or drop on demand inkjet which is preferably selected from the group thermal inkjet, piezo inkjet and electrostatic inkjet. The inkjet printer (500) is preferably a large-format inkjet printer (500) wherein printable width of more than 135 cm are common but also printable widths of more than 200 cm. An example of such large-format inkjet printer in a multi-pass inkjet printing method is Jeti Tauro™ manufactured by AGFA NV with a maximum printable width of 254 cm and which can accommodate for example rigid media up to 400 cm in length. An example of another large-format inkjet printer with a single-pass inkjet printing method is KBA RotaJet™ L-series with a maximum print width of 1.3 meter.

The inkjet printer (500) may comprise a page-wide inkjet print-head which covers the whole width or larger than the width of the natural leather (300), a so called single pass inkjet printer. In a preferred embodiment the pattern is inkjet printed in one pass, also called single-pass inkjet printing method, which guarantees an economical benefit by having larger throughputs than in a multi-pass inkjet printing method. Detailed information on inkjet technologies and building-up of inkjet printers can be found in 'Inkjet Technology and Product Development Strategies' by Stephen F. Pond, Torrey Pines, 2000.

To enhance the adhesion of the pattern on the natural leather (300) the printing device may comprise a dryer to dry the marked pattern on the natural leather (300) and/or to have a better adhesion of the marked pattern on the natural leather (300). A typical dryer (510), sometimes also called curing device, in such printing devices comprises an ultraviolet light (UV) source and/or infrared (IR) radiation source.

The drying of the marked pattern may be done by radiation (UV and/or IR and/or NIR and/or SWIR) from the back-side to the printed side of the natural leather (300). Or the drying of the marked pattern may be done by radiation (UV and/or IR and/or NIR and/or SWIR) above the marked pattern.

Any ultraviolet light source, as long as part of the emitted light, may be employed as a radiation source, such as a high or low pressure mercury lamp, a cold cathode tube, a black light, an ultraviolet LED, an ultraviolet laser, and a flash light.

The IR source is preferably a NIR source (=Near Infra-Red source) such as a NIR lamp or a SWIR (=Short Wave Infra-Red source) such as a SWIR lamp. The IR source may comprise carbon infrared emitters which has a very short response time. An IR source is also called infrared radiation source. The IR source may comprise an air blower for blowing hot air warmed up by the IR source.

The printing device which performs the present embodiment comprises, expressed in another way:

- a marking device, such as an inkjet head, for marking a natural leather (300),
- a first vacuum belt (150), supported by a upstream pulley ($P_{upstream}$) and downstream pulley ($P_{downstream}$), comprising a print area ($A^{Print}$) and vacuum area ($A_{vacuum}$).
- pair of sliding supports as support for the unwoven fabric (200), configured as a second vacuum belt, wherein the pair of sliding supports comprises a first sliding support (=upstream sliding support ($S_{upstream}$) and a second sliding support (=downstream sliding support ($S_{downstream}$)); wherein the second sliding support ($S_{downstream}$) is constructed downstream the print area ($A_{print}$) or the vacuum area ($A_{vacuum}$); and wherein the first sliding support ($S_{upstream}$) is constructed upstream the print area ($A_{print}$) or the vacuum area ($A_{vacuum}$); and wherein the unwoven fabric (200), configured as a second vacuum belt, is supported at the print area ($A_{print}$) or the vacuum area ($A_{vacuum}$). The sliding supports where over the unwoven fabric (200), configured as a second vacuum belt, is wrapped may each be comprised in a pulley.

The vacuum area ($A_{vacuum}$) preferably overlaps the print area ($A_{print}$) because the adhering by vacuum power while printing is of a big importance in print quality such as dot placement accuracy. The print area ($A_{print}$) (size and form) is mainly defined by the marking device and its movement (or not), such as a back and forth movable inkjet printhead in a multi-pass inkjet printer, and the vacuum area ($A_{vacuum}$) (size and form) is mainly defined by the apertures in the first vacuum belt (150) and the vacuum power of the vacuum table (900) underneath the first vacuum belt (150).

The print area ($A_{print}$) from the printing device of the present embodiment is preceded by an upstream area ($A_{upstream}$) wherein the natural leather (300) is applied on an adhesive tape in the printing device, supported by the second vacuum belt and wherein the unwoven fabric (200), configured as a second vacuum belt, is coming on the first vacuum belt (150) at an upstream belt contact position ($C_{CB1,\ upstream,\ CB2}$). Said upstream belt contact position ($C_{CB1,\ upstream,\ CB2}$) is thus the contact position wherein the second vacuum belt comes on the first vacuum belt (150) which is at the upstream side of the printing device from the present embodiment.

The print area ($A_{print}$) from the printing device of the present embodiment is followed by a downstream area ($A_{downstream}$) wherein the natural leather (300) is removed from the adhesive tape in the printing device and wherein the unwoven fabric (200), configured as a second vacuum belt, is leaving the first vacuum belt (150) at a downstream belt contact position ($C_{CB1,\ downstream,\ CB2}$). Said downstream belt contact position ($C_{CB1,\ downstream,\ CB2}$) is thus the contact position wherein the unwoven fabric (200), configured as a second vacuum belt, leaves the first vacuum belt (150) which is at the downstream side of the printing device from the present embodiment.

The unwoven fabric (200), configured as a second vacuum belt, is leaving the upstream sliding support ($S_{upstream}$) at a upstream sliding support contact position ($C_{S,upstream}$). The unwoven fabric (200), configured as a second vacuum belt, is coming on the downstream sliding support ($S_{downstream}$) at a downstream sliding support contact position ($C_{S,\ downstream}$).

The inkjet printer (500) may comprise a coating device for applying a base coat on the natural leather (300) when it is supported on the adhesive tape which is supported by said unwoven fabric (200) or for applying a top coat on the decorated natural leather when it is supported on the adhesive tape which is supported by said unwoven fabric (200).

The print area ($A_{print}$) from the printing device of the present embodiment is preceded by an upstream area ($A_{upstream}$) wherein the natural leather (300) is inserted in/on the printing device (input side) and wherein the natural leather (300) is coming attached with the first vacuum belt (150) at an upstream belt contact position ($C_{CB1,\ upstream,\ printreceiver}$) and is coming on the adhesive tape, supported by the unwoven fabric (200), configured as a second vacuum belt, at an upstream belt contact position ($C_{CB2,\ upstream,\ printreceiver}$).

- $C_{CB1,\ upstream,\ printreceiver}$ is thus the contact position wherein the natural leather (300) comes attached with the first vacuum belt (150) which is at the upstream side of the printing device from the present embodiment.
- $C_{CB2,\ upstream,\ printreceiver}$ is thus the contact position wherein the natural leather (300) comes on the adhesive tape, supported by the second vacuum belt, which is at the upstream side of the printing device from the present embodiment.

The print area ($A_{print}$) from the printing device of the present embodiment is followed by a downstream area ($A_{downstream}$) wherein the natural leather (300) is outputted from the printing device and wherein the natural leather (300) is leaving the first vacuum belt (150) at a downstream belt contact position ($C_{CB1,\ downstream,\ printreceiver}$) and is leaving the adhesive tape, supported by the unwoven fabric (200), configured as a second vacuum belt, at a downstream belt contact position ($C_{CB2,\ downstream,\ printreceiver}$).

- $C_{CB1,\ downstream,\ printreceiver}$ is thus the contact position wherein the natural leather (300) detaches from the first vacuum belt (150) which is at the downstream side of the printing device from the present embodiment.
- $C_{CB2,\ downstream,\ printreceiver}$ is thus the contact position wherein the natural leather (300) leaves the adhesive tape, supported by the second vacuum belt which is at the downstream side of the printing device from the present embodiment.

The First Vacuum Belt

The inkjet printer (500) of the present embodiment comprises two vacuum belts:

- a first vacuum belt (150) for conveying a second belt which is suitable for conveying under an inkjet print head (505) a natural leather (300).
- The second vacuum belt is also vacuum belt and more preferably a vacuum belt made of an unwoven fabric (200).

A conveyor belt is a belt for conveying a load, such as a natural leather (300). A conveyor belt has a support side whereon the print load is conveyed and a back side which is in contact with a pair of pulleys or gliding supports (805, 807).

There is a substantial parallel relationship to the longitudinal axis of these pulleys to convey the conveyor belt straight over these pulleys. These parallel pulleys are also called belt pulleys (905, 907). The first vacuum belt (150) is such a conveyor belt.

The width of the first vacuum belt (150) is the distance of the belt which is measured in the parallel direction as the pair of pulleys. The width of said belt is the distance between the edges of the conveyor belt across the conveyor belt parallel to these parallel pulleys.

The length of the first vacuum belt (150) is the distance of the belt which is measured perpendicular to the parallel direction as the pair of pulleys. It defines the length of the loop which is formed by said belt.

The minimum path of the first vacuum belt (150) is the minimum distance that said belt may convey over its pair of pulleys.

The conveying direction of the first vacuum belt (150) is the direction of conveying the belt which is perpendicular to a pair of pulleys whereon the belt is wrapped or looped. The conveying direction of the first vacuum belt (150) defines the path that belt is following over the wrapped pair of pulleys.

A pulley is a cylinder preferably mounted on a central axis rod. The pulley comprises a pulley cover which comes in contact with the first vacuum belt (150).

A pulley may comprise a belt guider to prevent or minimize swimming of the belt over the pair of pulleys. Swimming of a belt is a phenomenon that moves the pulley left to right or right to left over the pulley perpendicular the conveying direction.

The first vacuum belt (150) in the present embodiment is also wrapped around a vacuum table (900). The first vacuum belt (150) comprises therefore a plurality of apertures whereby a vacuum area ($A_{vacuum}$) can be created in the printing device by vacuum power of the vacuum table (900). Such a vacuum area may comprise a plurality of vacuum sub areas if for example the vacuum table (900) comprises a plurality of vacuum sub chambers. The first vacuum belt (150) is thus a permeable conveyor belt, more precisely an air-permeable conveyor belt, sometimes called a porous conveyor belt. The bottom of the first vacuum belt (150); which is the back side; is in contact with the vacuum table (900) and the top of the first vacuum belt (150); which is the support side; comprises a support zone for the unwoven fabric (200), configured as a second vacuum belt, in the present embodiment. The wrapping of a conveyor belt is sometimes in literature called 'looped' around its pulleys. In the present embodiment is the first vacuum belt (150) looped around a vacuum table (900) and a pair of pulleys, namely the upstream pulley ($P_{upstream}$) and the downstream pulley ($P_{downstream}$).

Preferably is the width of the first vacuum belt (150) between 1 meter and 10 meter, more preferably between 3 meter and 6 meter.

The printing device from the present embodiment comprises preferably adjustment means to align the longitudinal axis of the pair of pulleys ($P_{upstream}$ and $P_{downstream}$) of the present embodiment to become parallel to each other. Such adjustment means are well-known in the prior-art. Also the use of more than two pulleys where over the first vacuum belt (150) is wrapped is well-known in the prior-art especially extra pulleys to alter the tensioning of the conveyor belt or to control the conveyor belt to have a straight path over the wrapped pulleys.

A printing device with a vacuum belt to convey a print receiver for marking a pattern on it, is well-known in the state-of-the-art. An example of such printing device is Jeti Tauro™ manufactured by AGFA NV™.

Preferably the first vacuum belt (150) from the present embodiment has two or more layers of materials wherein an under layer provides linear strength and shape, also called the carcass and an upper layer called the cover or the support side. The carcass is preferably a woven fabric web and more preferably a woven fabric web of polyester, nylon, glass fabric or cotton. The material of the cover comprises preferably various rubber and more preferably plastic compounds and most preferably thermoplastic polymer resins. The cover of the first vacuum belt (150) is in a preferred embodiment of the present embodiment the side which is supporting the unwoven fabric (200), configured as a second vacuum belt, in a vacuum area ($A_{vacuum}$) of the printing device. Because the unwoven fabric (200) in the present embodiment is also a vacuum belt the vacuum area ($A_{vacuum}$) is located at the unwoven fabric for attracting the adhesive tape (1300).

The carcass of the first vacuum belt (150) is in a preferred embodiment of the present embodiment the side which is in contact with the pair of pulleys from the present embodiment. The carcass is in the present embodiment preferably urethane impregnated to minimize the noise of conveying and rubbing the first vacuum belt (150) over the pair of pulleys and over the vacuum table (900).

The support-side (top-side, cover) of the first vacuum belt (150) comprises preferably a thermoplastic polymer resin coated on a rough layer. The support area of the present embodiment is preferably abraded engineering plastic composition or comprises polyethylene terephthalate (PET), polyamide (PA), high-density polyethylene (HDPE), polytetrafluoroethylene (PTFE), polyoxymethylene (POM) and/or Polyaryletherketone (PAEK).

The top surface of the first vacuum belt (150) (thus the cover whereon the unwoven fabric (200), configured as a second vacuum belt, from the present embodiment is carried) comprises preferable hard urethane with a preferred thickness (measured from top surface to bottom surface) between 0.2 to 2.5 mm. The total thickness (measured from top surface to bottom surface) of the first vacuum belt (150) is preferably between 1.2 to 7 mm.

The first vacuum belt (150) may comprise a thermoplastic middle layer for easy looping around the pair of pulleys from the present embodiment.

The thickness of the first vacuum belt (150) is preferably between 1 mm and 5 mm; more preferably between 1.5 mm and 3.5 mm. The thickness of the first vacuum belt (150) is chosen to carry the second conveyor belt and the natural leather (300) but especially for said loads a thickness between 2 mm and 3 mm preferred.

The pitch line of the first vacuum belt (150) is preferably below one third of the thickness of the first vacuum belt (150), more preferably below one fifth of the thickness of the first vacuum belt (150), measured from the back-side of the first vacuum belt (150), which is the side in contact of its wrapped pulleys.

The pitch line of the first vacuum belt (150) is preferably between 0 and 2 mm; more preferably between 0 and 1 mm and most preferably between 0.1 and 0.8 mm. These distances are measured from the back-side of the first vacuum belt (150), which is the side in contact of its wrapped pulleys.

Such a pitch line of the first vacuum belt (150) is important in the present embodiment to have a high marking accuracy; especially in printing device with a high print resolution and inkjet printing devices comprising inkjet heads which are capable of jetting small droplets less than 12 pL. The pitch line is the plane within a conveyor belt which undergoes neither stretching nor compression when the belt rounds the pulley, i.e., the neutral plane of the belt structure.

To have a better sucking towards the unwoven fabric (200), configured as a second vacuum belt, together with the first vacuum belt (150) on the vacuum table (900) the first vacuum belt (150) has than a plurality of holes so that the air can be directed and sucked through the first vacuum belt (150). The plurality of these holes may be small in size, preferably from 0.3 to 10 mm in diameter, more preferably from 0.4 to 5 mm in diameter, most preferably from 0.5 to 2 mm in diameter and preferably spaced evenly apart on the first vacuum belt (150) preferably 3 mm to 50 mm apart, more preferably from 4 to 30 mm apart and most preferably from 5 to 15 mm apart to enable the creation of uniform vacuum pressure that sucks the unwoven fabric (200), configured as a second vacuum belt, together with the first vacuum belt (150).

The first vacuum belt (150) is tensioned between the pair of pulleys from the present embodiment. The tensioning may be caused by aligning the parallel pulleys and/or widen the distance between the longitudinal axes of the pair of pulleys in the present embodiment. This tensioning of the first vacuum belt (150) is important for heavy print receivers and for heaving correct print alignment of the marked pattern.

The mounting of the first vacuum belt (150) in the printing device asks for a demanding procedure wherein the tensioning over the pair of pulleys is measured and controlled for example by widening the longitudinal axes from each other. Both edges (left and right) of the conveyor belt are also controlled to calculate the swim and/or drift of the conveyor belt over the pair of pulleys. By adapting the tensioning, the swim and/or drift is controlled. The stability of the drift and/or swim and tensioning of the first vacuum belt (150) is subsequently controlled for more than one hour (=relaxation phase). If some deformations in the first vacuum belt (150) are seen in this demanding procedure; a wait time of twelve hours are needed for relaxation of the first vacuum belt (150) where after the whole procedure had to be restarted.

The effective tensile force on the first vacuum belt (150) has to be at least equal or even greater than the required force for slippage-free conveying.

The tensioning of the first vacuum belt (150) may be controlled by attaching an extra pulley whereon the first vacuum belt (150) is wrapped and which may be angled versus the longitudinal axes of the pair of pulleys. Such an extra pulley is sometimes called an alignment pulley or an align roller.

The conveying of the first vacuum belt (150) is preferably driven by a motor; more preferably an electric stepper motor; to produce a torque to one of its pulley from the pair of pulleys so by friction on the first vacuum belt (150) and the powered pulley the natural leather (300) on the adhesive tape (1300) and unwoven fabric (200), configured as a second vacuum belt is conveyed in a conveying direction. The use of an electric stepper motor makes the transport of a natural leather (300) more controllable e.g. to change the speed of conveying and move the load on the vacuum belt in successive distance movements. An example of a conveying belt with an electric stepper motor is described for the media transport of a wide-format printer in EP 1235690 (ENCAD INC). A preferred embodiment comprises a system for conveying of the first vacuum belt (150) with successive distance movements; also called discrete step increments to transport the natural leather (300) and unwoven fabric (200), configured as a second vacuum belt.

Another way of conveying the first vacuum belt (150) is by a belt step conveyor system with high accurate position capabilities due to a moving belt gripper mounted on a linear movement system to convey the first vacuum belt (150) in successive distance movements while the moving belt gripper engaged the first conveying belt and the moving belt gripper is moved from a home position to an end position by the linear movement system. The first vacuum belt (150) is stagnated by the engaging of a stagnating belt gripper while the moving belt gripper moves back to its home position else the stagnating belt gripper has released the conveyor belt. An example of such conveyor system is disclosed in WO2014184226 (AGFA NV).

Any variety of encoder mechanisms can be employed for controlling linefeed distances while conveying the first vacuum belt (150). Typically, a rotary encoder is connected to a belt drive roller; belonging to the pair of pulleys. The information provided by the encoder is processed by the printing device to control the linefeed distance.

The printing device may comprise multiple conveyor belts as the first vacuum belt (150) for example with a different amount of apertures to create different vacuum force.

A preferred first vacuum belt for the present embodiment is disclosed in US20180264851 (AGFA NV) or more preferred first vacuum belt for the present embodiment is disclosed in EP3266619 (AGFA NV).

Vacuum Table

A vacuum table (900) is a vacuum support. A vacuum chamber comprised in the printing device of the present embodiment hold-downs a natural leather (300) against said vacuum table (900). The natural leather (300) and said vacuum table (900) are 'sandwiching' the adhesive tape (1300), the first vacuum belt (150) and the unwoven fabric (200), configured as a second vacuum belt.

Preferably the vacuum table (900) in the embodiment comprises a set of air-channels to provide a pressure differential by a vacuum chamber at the support layer of the vacuum table (900) to create a vacuum area ($A_{vacuum}$) and at the bottom-surface of the printing table a set of apertures which are connected to the set of air-channels. These apertures at the bottom layer may be circular, elliptical, square, rectangular shaped and/or grooves, such as slits, parallel with the bottom layer of the vacuum table (900).

The support layer of the printing table should be constructed to prevent damaging of a natural leather (300), unwoven fabric or vacuum support if applicable. For example, the apertures at the support layer that are connected with the air-channels may have rounded edges. The support layer of the printing table may be configured to have low frictional specifications.

The top-surface, also called the support surface, of the vacuum table (900) or a portion of the vacuum table (900), such as the inner side of its air-channels may be coated to have easy cleaning performances e.g. as result of dust or ink leaks. The coating is preferably a dust repellent and/or ink repellent and/or hydrophobic coating. Preferably the top-surface of the vacuum table (900) or a portion of the vacuum table (900), such as the inner side of its air-channels, is treated with an ink repelling hydrophobic method by creating a lubricious and repelling surface which reduces friction.

A vacuum-support-air-channel is an air-channel from the support surface to the bottom surface of the vacuum support. It is also called a suction-hole if the perimeter of the vacuum-support-air-channel at the support surface is substantially circular.

The area of a vacuum-support-air-channel at the support surface of the vacuum support is in the present embodiment preferably between 0.3 mm$^2$ and 5 mm$^2$. More preferably the perimeter of the vacuum-support-air-channel at the support surface has the same shape as a circle, ellipse, oval, rectangle, triangle, square, rectangle, pentagon, hexagon, heptagon, octagon or any polygon containing at least three sides.

The vacuum-support-air-channel is preferably tapered in the direction of the bottom surface for optimal vacuum pressure effect at the support surface.

The distribution of air-channels on the support surface of the vacuum support is preferably between 1 air-channel per dm$^2$ and 100 air-channels per dm$^2$; more preferably between 5 air-channels per dm$^2$ and 50 per dm$^2$.

The perimeter of a suction-hole is preferably from 0.3 to 10 mm in diameter, more preferably from 0.4 to 5 mm in diameter, most preferably from 0.5 to 2 mm in diameter The vacuum-belt-air-channels in the air-sucking zone; also called vacuum area ($A_{vacuum}$); are preferably spaced evenly apart on the vacuum support preferably 3 mm to 50 mm apart, more preferably from 4 to 30 mm apart and most preferably from 5 to 15 mm apart to enable the creation of uniform vacuum pressure that holds the natural leather (300) together with the vacuum support.

A vacuum chamber is a rigid enclosure which is constructed by many materials preferably it may comprise a metal. The choice of the material is based on the strength, pressure and the permeability. The material of the vacuum chamber may comprise stainless steel, aluminium, mild steel, brass, high density ceramic, glass or acrylic.

A vacuum pump provides a vacuum pressure inside a vacuum chamber and the vacuum pump is connected by a vacuum pump connector, such as a tube, to a vacuum pump input such as aperture in the vacuum chamber. Between the vacuum pump connector, a vacuum controller, such as a valve or a tap, may be provided to control the vacuum in a sub-vacuum chamber wherein the aperture is positioned.

A preferred vacuum table for the present embodiment is disclosed in U.S. Pat. No. 9,962,963 (AGFA NV). Another preferred vacuum table for the present embodiment is disclosed in U.S. Pat. No. 9,573,393 (AGFA NV).

The Second Vacuum Belt

The inkjet printer (500) of the present embodiment comprises two vacuum belts:

a first vacuum belt (150) for conveying a second belt which is suitable for conveying under an inkjet print head (505) a natural leather (300).

The second vacuum belt is a vacuum belt and more preferably a vacuum belt made of an unwoven fabric (200).

The unwoven fabric (200), configured as a second vacuum belt, in the present embodiment has the function of supporting a natural leather (300) in the present embodiment. Said second vacuum belt is hereby wrapped around minimum two sliding supports, which may be pulleys. The unwoven fabric (200), configured as a second vacuum belt, is actually looped around the first vacuum belt (150) and in the same direction of the first vacuum belt (150).

The area for applying the adhesive tape (1300) on the second vacuum belt is preferably larger than the natural leather (300) and preferably flat. Said adhesive tape (1300) covers partly said second vacuum belt to have good adherence at the edges of said adhesive tape (1300). When said second vacuum belt is even sized than said adhesive tape (1300) and said adhesive tape (1300) is fully covering said belt, an edge of said adhesive tape (1300) can crimp (wavy or curl). This may result in a collision of the adhesive tape (1300) or supported natural leather against a print head (505) of the inkjet printer (500).

The second vacuum belt comprises one or more fibrous layers wherein the the other side (=not the additive side) of the adhesive tape (1300) is preferably in contact with a fibrous layer from said one or more fibrous layers. Said fibrous layer attaches easily to said fibrous and tufted corium side (370). Said fibrous layer may be coated and/or is an unwoven fabric (200) such as felt. Said felt may be wool felt but preferably it is a polyester felt. Also recycled polyester felt may be used. Polyester felt are most preferred because said felts have a tighter construction and they can be used in operating temperature above 30° C. Polyester felt may be blended with other materials such as wool.

To minimize the vacuum power for the air suction in the present embodiment the air-permeability of the second vacuum belt may be at 200 Pa difference pressure between 30 and 120 L/(dm$^2$×min) preferably between 35 and 90 L/(dm$^2$×min). Said air-permeability can be measured with an AKUSTRON™ air permeability tester which follows industry standards DIN 53887, DIN 53120, IS09237 and ASTM D 737-96. The air-permeability is thus measured in minutes, abbreviated as 'min'.

If the second vacuum belt comprises a plurality of layers on top of each other, one or more of said layers is a fibrous layer but preferably all layers are fibrous. Said layers needs to be also air-permeable. The air-permeability of said second vacuum belt is measured on all said multiple layers. Preferably a first layer from said plurality of layers in contact with the adhesive tape (1300) is having a smaller air-permeability than a second layer, which is a subsequent layer of the first layer. Most preferably a subsequent layer of a layer of the plurality of layers has a higher air-permeability.

In the present embodiment the second conveyor belt may comprises a register mark for arranging the natural leather (300) or more than one natural leathers on a semi-transparent or transparent adhesive tape (1300). Said register mark may be a ruler, a grid of n×m small squares or one or more small lines for easy registering said natural leather (300) or even more than one natural leather (300). Said mark may comprise an identification code or means for calculating distances. A register mark may also be part of the adhesive tape. Said register mark may be a ruler, a grid of n×m small squares or one or more small lines for easy registering said natural leather (300) or even more than one natural leather (300).

For easy handling and having a certain stiffness the second vacuum belt the weight is preferably between 0.6 and 2.5 kg/m$^2$. The thickness of said belt is than preferably between 0.5 mm and 4 mm, more preferably between 1.5 mm and 3 mm. In a preferred embodiment is the thickness of the second vacuum belt twice or more than the thickness of the supported natural leather (300) on the adhesive tape but more preferably the thickness of the second vacuum belt is not more than 100 times the thickness of the supported natural leather (300) on the adhesive tape.

Also heat pressing of the decorated natural leather may be performed in the manufacturing line when said leather is still attached with said corium side (370) to the adhesive tape (1300). The manufacturing line of the present embodiment comprises than also heat press for said heat pressing. Hereby is the natural leather (300) preferably a crusted leather which is more preferably base coated prior printing a decorated image and which is most preferably top coated after printing said image by a coating device, which is then part of the manufacturing line. Said base coat, natural leather (300), decorative image and top coat may than be sandwiched together by said heat pressing step. A skin texture relief may additional be applied on said top coat while or after the heat pressing step.

The conveying is preferably with successive distance movements, also called discrete step increments which is caused by the conveying of the first vacuum belt (150).

The support side of the second vacuum belt, which is in the present embodiment the side in contact with the opposite side (=not the adhesive side) of the adhesive tape (1300) may be impregnated and/or coated with PUR and/or glue. Also the other side, which shall be in contact with the first conveyor belt may also be impregnated for better sliding for example impregnation with PUR.

When one or more natural leathers are supplied on the adhesive tape (1300), the position may be scanned by a camera-system (1004) above said adhesive tape (1300). Said camera-system (1004) is then part of the inkjet printer (500) of the present embodiment. If said second vacuum belt has a registration mark and the adhesive tape (1300) is semi-transparent or transparent registration means or an identification code said scanning can be used for optimizing the supply chain of the decorated natural leathers of the present embodiment. In post-processing of the decorated natural leather said identification code and positions of said one or more natural leathers can be used for example in cutting or heat-pressing or embossing or top-coating said natural leathers if they are still on said second vacuum belt. The use of a scanner-system in an inkjet printer for printing natural leather is disclosed in paragraph [0049] and claim 17 of US2013/0239833 (CODUS HOLDINGS LIMITED). Fora good capturing of the natural leather by said camera-system (1004), the adhesive tape is preferably nonglossy, thus matt, for avoiding the capturing of light incidence on said tape. The unrolling from an adhesive tape-roll of the adhesive tape (1300) before the application on the second conveyor belt may result in an annoying noise which can be limited isolation the noise for example by applying a soundproof box around said adhesive tape-roll of said tape. The unrolling of the adhesive tape may be comprising a step of stretching said tape before it is applied on the second conveyor belt to avoid crinkles in said tape for example by using a spreader roll.

When the one or more natural leathers are scanned by the camera-system (1004), the edges, forming a contour, may be detected and provided to the inkjet-printer or the image-converter, such as a raster image processor, to prevent that ink is spoiled over the edges of the one or more natural leathers and on the adhesive tape and/or second conveyor belt when an image, such as decorative pattern, is printed on the one or more natural leathers. An image is mostly stored in memory as a rectangular array of pixels. The contour of the held natural leather is not always rectangular and mostly irregular shaped. The prevention may easily be performed by masking parts of an image based on the detected edges of the one or more natural leathers. The scanner may even detect bites or bad parts in the one or more natural leathers so also no ink is spoiled on said parts or bites. The position of the one or more natural leathers, known by the scanning and detection can also be used in nesting images over the one or more natural leathers such as in the application from Elitron™: EliNest.

The camera-system may be a digital 2D-camera or 3D-camera or line-camera positioned above the adhesive tape. The camera-system may have means for transporting said camera's in the 3 dimensions (height, width and length) towards the natural leather or away from the natural leather. The camera-system may also have one or more lenses for capturing scaled images from the natural leather which is held on said air-permeable support.

The unwoven fabric (200), configured as a second vacuum belt, is also wrapped around a pair of sliding supports (805, 817) which are substantially parallel to each other. The sliding supports are also substantially parallel to the pair of pulleys where around the first vacuum belt (150) from the present embodiment is wrapped. In a preferred embodiment of the present embodiment is a sliding support, from the pair of sliding supports, part from a pulley (815, 817), more preferably the pair of sliding supports is another pair of pulleys, thus not the pair of pulleys where over the first vacuum belt (150) is wrapped. Such pulley of the another pair of pulleys; which comprises a sliding support from the present embodiment; may be unrotatable but preferably rotatable around its longitudinal axis. The rotation of the pulley is in the present embodiment preferably performed by friction of the unwoven fabric (200), configured as a second vacuum belt, while transporting by the first vacuum belt (150). The rotation of the pulley may be driven by a motor for example for easy handling the unwoven fabric (200), configured as a second vacuum belt, on the first vacuum belt (150) or lightly controlling the transport direction and movement of the unwoven fabric (200), configured as a second vacuum belt.

In order to better understand the invention: the pair of sliding supports ($S_{upstream}$ and $S_{downstream}$) is mounted outside the first vacuum belt (150), so the first vacuum belt (150) is not wrapped around the pair of sliding supports and the pair of sliding supports are no part of the pair of pulleys whereon the first vacuum belt (150) from the present embodiment is wrapped and so the first vacuum belt (150) is not in contact with the pair of sliding supports (805, 807).

The unwoven fabric (200), configured as a second vacuum belt, is at its back-side in contact, possibly through an air-flow of an air-cushion system, comprised in a sliding support, with these pair of sliding supports; which may be another pair of pulleys. The side from a sliding support whereon the unwoven fabric (200), configured as a second vacuum belt, from the present embodiment is supported is called the support surface or support side of the sliding support.

The unwoven fabric (200), configured as a second vacuum belt, may be wrapped also around an extra pulley or extra plurality of pulleys, such as dancer rollers, which are not in contact with the first vacuum belt (150) and constructed outside the first vacuum belt (150).

Due to the rotation of the unwoven fabric (200), configured as a second vacuum belt; which is in contact by suction in a vacuum area ($A_{vacuum}$) from the first vacuum belt (150) while rotating the first vacuum belt (150) around its pair of pulleys ($P_{upstream}$, $P_{downstream}$) from the present embodiment; a natural leather (300) on the unwoven fabric (200), configured as a second vacuum belt, is conveyed in the printing device between a sliding support, also called the upstream sliding support ($S_{upstream}$) and another sliding support, also called the downstream sliding support ($S_{downstream}$). The pair of sliding supports (805, 807); where over the unwoven fabric (200), configured as a second vacuum belt, is wrapped; includes the upstream sliding support ($S_{upstream}$) and the downstream sliding support ($S_{downstream}$). Analogue the pair of pulleys, where over the first vacuum belt (150) is wrapped, includes an upstream pulley ($P_{upstream}$) and downstream pulley ($P_{downstream}$) wherein between the unwoven fabric (200), configured as a second vacuum belt, is conveyed and thus also the natural leather (300). The marking of the natural leather (300) is performed between the upstream sliding support ($S_{upstream}$) and the downstream sliding support ($S_{downstream}$).

The conveying direction of the first vacuum belt (150), natural leather (300) and unwoven fabric (200), configured as a second vacuum belt, is determined from upstream zone to downstream zone, from the upstream sliding support ($S_{upstream}$) to the downstream sliding support ($S_{downstream}$) and from the upstream pulley ($P_{upstream}$) to the downstream pulley ($P_{downstream}$).

The width of the unwoven fabric (200), configured as a second vacuum belt, is the distance of the unwoven fabric (200), configured as a second vacuum belt, which is measured in the parallel direction as the pair of sliding supports. The width of the unwoven fabric (200), configured as a second vacuum belt, is the distance between the edges of the unwoven fabric (200), configured as a second vacuum belt, across the unwoven fabric (200), configured as a second vacuum belt, parallel to these parallel sliding supports. The width of said unwoven fabric (200) is preferably between 1 m and 10 m.

Multiple natural leathers may be placed next to each other on the adhesive tape (1300) which is supported on said unwoven fabric (200). The inkjet printer (500) may have movable alignment pins which slides over a media set bar to be fixed at desired positions. An alignment pins aligns one of said multiple natural leathers. Jeti Tauro™, manufactured by AGFA NV, has such pin configuration to print on aligned one or more natural leathers with a so called media set bar.

Figure 4:
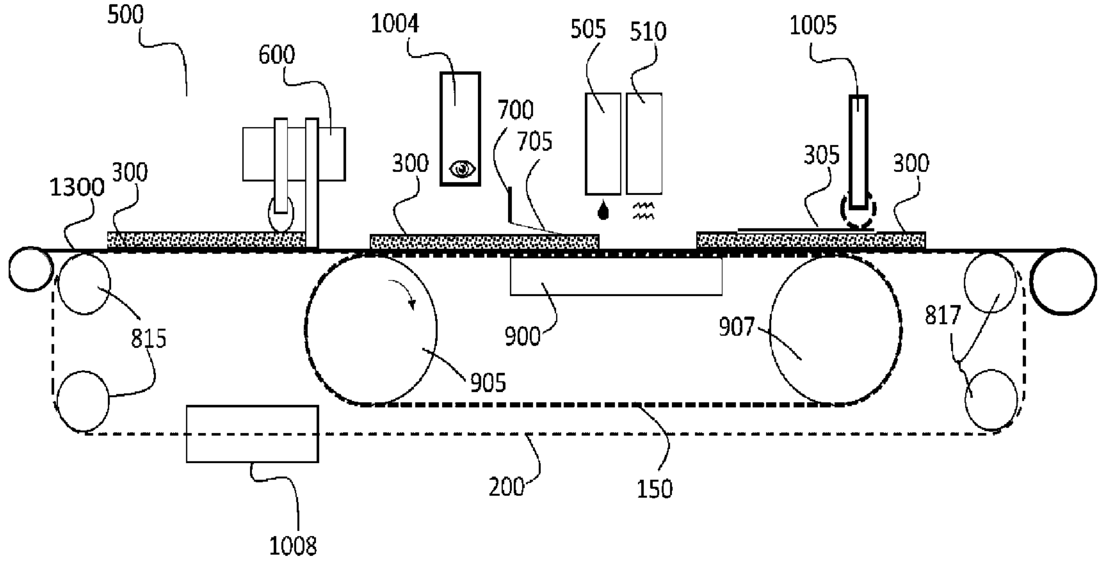
Figure 5:
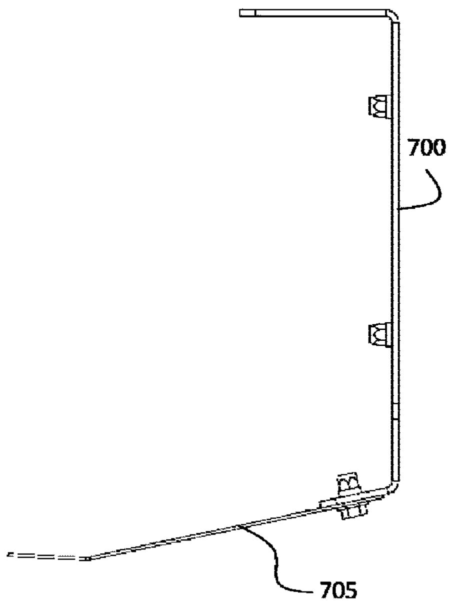
FIG. 5 illustrates a cross-cut of a pressure device (700) having a portion (705) from a preferred embodiment of the present invention.
Figure 6:
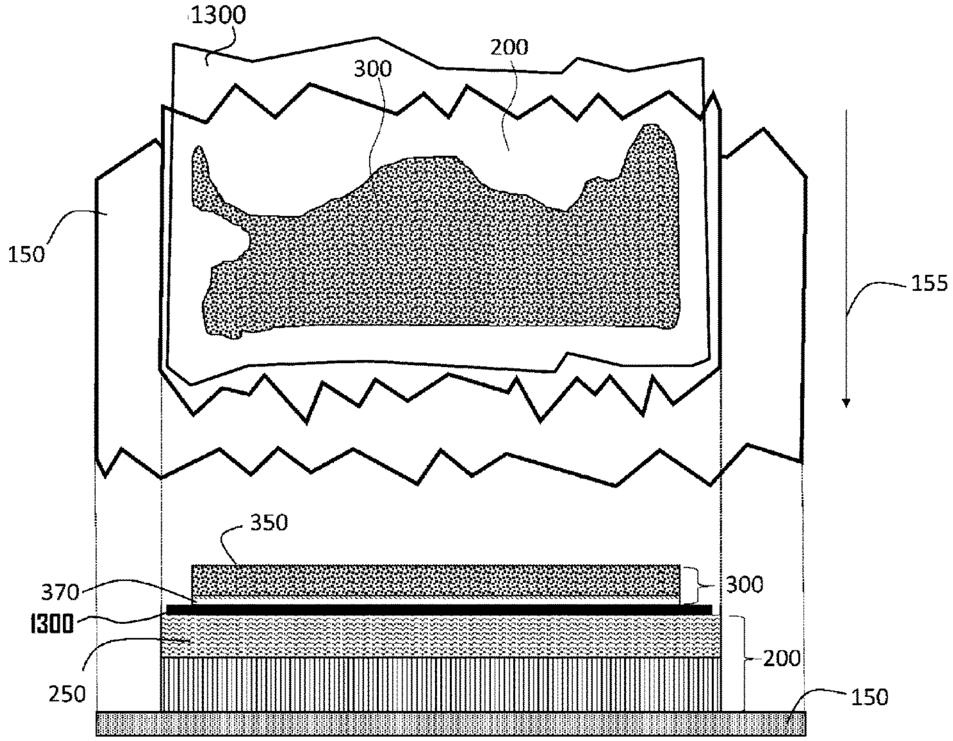
FIG. 6, FIG. 7 illustrates a top view- and cross-cut of preferred embodiments of the present invention. A natural leather (300) is carried on an adhesive tape (1300) which is supported on an unwoven fabric (200), configured as vacuum belt. Said vacuum belt is carried on another vacuum belt (150). The natural leather (300) has a grain side (350) and a corium side (370). The unwoven fabric (200) has a fibrous layer (250) which is in contact with said corium side (370).
Figure 7:
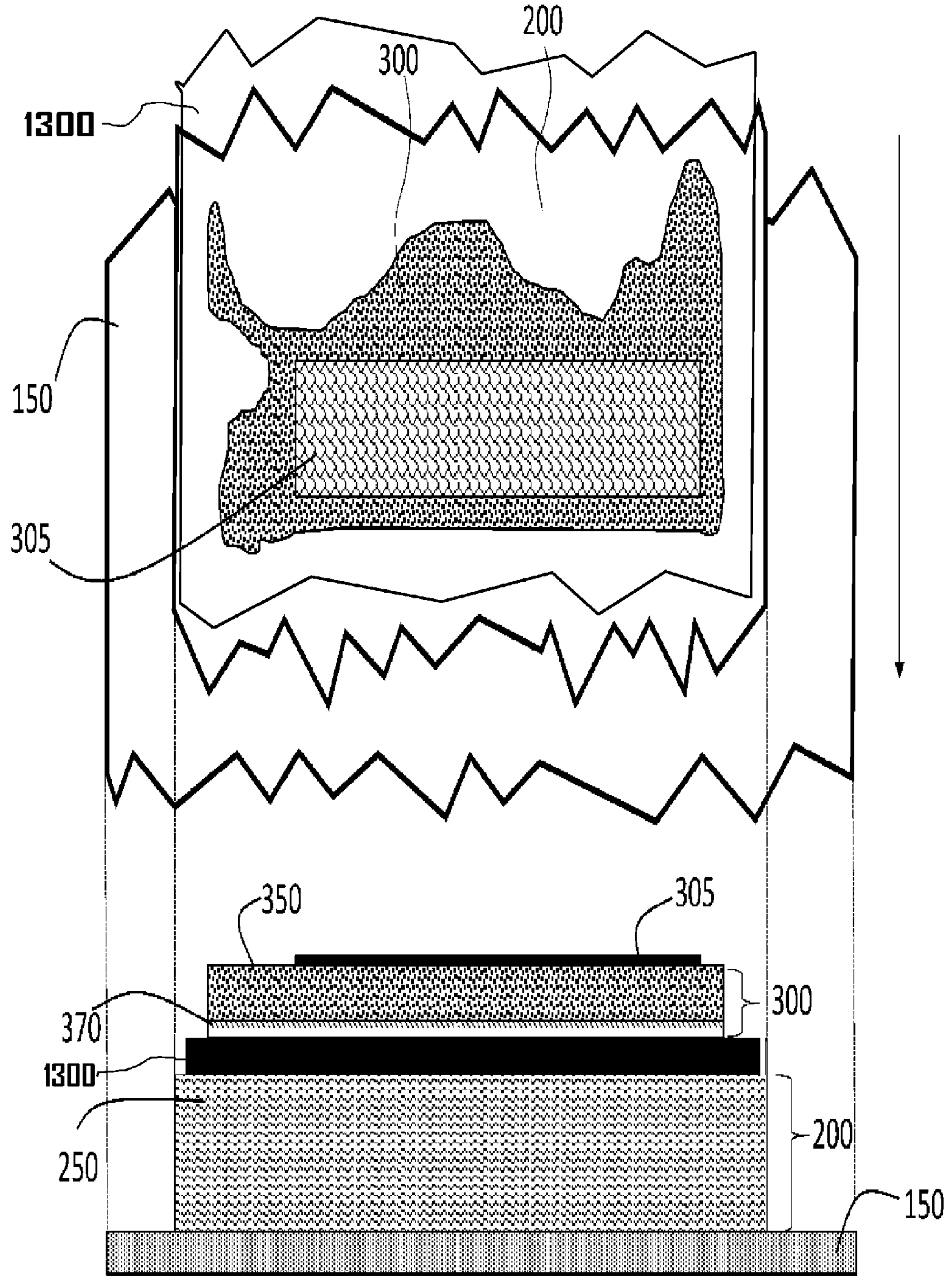

The configuration from the present embodiment makes it possible to add a pinch roll before the media set bar and close enough to said media set bar. See also FIG. 4. This makes it possible to continue printing natural leathers:

- a first set of natural leathers is applied on the adhesive tape, which has an pressure sensitive adhesive at its adhesive side, and moved in the directions of the print head for decorating said first set of natural leathers. Meanwhile the second set of natural leathers is applied against the media set bar, which is moved towards the adhesive tape (DOWN) and the pinch roll is moved away from the adhesive tape (UP). Said second set of natural leathers are thus applied between the pinch roll and the adhesive tape and against the media set bar. Said second set of natural leathers slips over the moving adhesive tape but remains on its place by said media set bar which is moved towards the adhesive tape (DOWN). If all natural leathers of said second set of natural leathers are applied, the pinch roll go down (DOWN) in the direction of the adhesive tape and presses the second set of natural leathers against the adhesive side of the adhesive tape which activates the adhesive. Meanwhile the media set bar is moved away from the adhesive tape (UP) whereby the second set of natural leathers are moving in the direction of the print head for decorating said second set of natural leathers. It is hereby important that the pinch roll is located very near the media set bar. They are both parallel to each other and the distance is preferably between 10 mm and 500 mm. If said distance is to large, it is found that the one or more natural leathers from the set of natural leathers are crunching against the media set bar. This method makes a fast production possible because the inkjet printer can continuous print set of natural leathers. Said pinch roll has preferably an outer layer in PTFE to overcome that an applied natural leather is turning around the pinch roll. Said outer layer of the pinch roll is the one which comes in contact with the natural leather.

The length of the unwoven fabric (200), configured as a second vacuum belt, is the distance of the unwoven fabric (200), configured as a second vacuum belt, which is measured perpendicular to the parallel direction as the pair of sliding supports. It defines the length of the loop which is formed by the unwoven fabric (200), configured as a second vacuum belt.

The conveying direction of the unwoven fabric (200), configured as a second vacuum belt, is the direction of conveying the unwoven fabric (200), configured as a second vacuum belt, which is perpendicular to a pair of sliding supports whereon the unwoven fabric (200), configured as a second vacuum belt, is wrapped or looped. The conveying direction of the unwoven fabric (200), configured as a second vacuum belt, defines the path that conveyor belt is following over the wrapped pair of sliding supports.

A sliding support may comprise a belt guider to prevent or minimize swimming of the unwoven fabric (200), configured as a second vacuum belt, over the pair of sliding supports which is left-to-right/right-to-left movement of the unwoven fabric (200), configured as a second vacuum belt, in a direction perpendicular the conveying direction of the unwoven fabric (200), configured as a second vacuum belt.

The printing device from the present embodiment comprises preferably adjustment means to align the longitudinal axis of the pair of sliding supports of the present embodiment to become parallel to each other.

The printing device may comprise multiple conveyor belts as the unwoven fabric (200), configured as a second vacuum belt, for example and as preferred embodiment with different glue to create different glue zones depending on the print receivers carried on these multiple conveyor belts as the unwoven fabric (200), configured as a second vacuum belt. The multiple conveyor belts are then also wrapped around the pair of sliding supports from the present embodiment.

In a preferred embodiment the unwoven fabric (200), configured as a second vacuum belt, comprises a ruler and/or indexer which may be used for measuring the movement and/or speed of the unwoven fabric (200), configured as a second vacuum belt, for example by a sensor, such as an encoder and an optical linear encoder, or measuring the sizes of the natural leather (300). The signals from the sensor, such as an optical linear encoder, after reading the ruler and/or indexer determines in a control system the position of the unwoven fabric (200), configured as a second vacuum belt, or the speed of the unwoven fabric (200), configured as a second vacuum belt, and indirectly the position of natural leather (300) carried on the unwoven fabric (200), configured as a second vacuum belt. The encoder may have a digital resolution between 0.01 μm and 250 μm, more preferably a digital resolution between 0.01 and 50 μm and most preferably a digital resolution between 0.01 and 10 μm. Especially when the unwoven fabric (200), configured as a second vacuum belt, moves in successive distance movements such small digital resolutions are important to calculate from the encoder signals the real successive distance movements. The ruler and/or indexer may be comprised on the support side of the unwoven fabric (200), configured as a second vacuum belt; which is the side in connection with the natural leather (300) and/or on the back side of the unwoven fabric (200), configured as a second vacuum belt; which is the side in connection with the first vacuum belt (150).

In a preferred embodiment of the present embodiment the unwoven fabric (200), configured as a second vacuum belt, is hanging, more preferably freely hanging, between the downstream sliding support ($S_{downstream}$) and the upstream sliding support ($S_{upstream}$). The tension between the downstream and upstream sliding support ($S_{upstream}$) is preferably lower than the tension on the first vacuum belt (150) from the present embodiment and more preferably untensioned between the downstream and upstream sliding support ($S_{upstream}$). For clarification the tension means in here the force on the conveyor belt along the conveying direction, also called the conveying-direction-tension. An extra advantage of a lower tensioning or untensioned conveying of the unwoven fabric (200), configured as a second vacuum belt, between the downstream and upstream sliding support ($S_{upstream}$) is that the life-time of the unwoven fabric (200), configured as a second vacuum belt, is enlarged.

The total sum of tension inside the unwoven fabric (200), configured as a second vacuum belt, is preferably lower than the total sum of tension inside the first vacuum belt (150) especially while printing.

If the tensioning of the unwoven fabric (200), configured as a second vacuum belt, is equal or higher versus the first vacuum belt (150) it is found that the unwoven fabric (200), configured as a second vacuum belt, generates easily crinkles and/or unpredicted internal tensions which results in position changes of the natural leather (300) on top of the unwoven fabric (200), configured as a second vacuum belt. Such position changes reduced the print quality of the printed patterns or may collapse the natural leather (300) against the marking device or dryer from the printing device. Also it makes it harder to apply an unwoven fabric (200), configured as a second vacuum belt, around the first conveyor belt and the upstream sliding support ($S_{upstream}$) and downstream sliding support ($S_{downstream}$) so the total sum of tension inside the unwoven fabric (200), configured as a second vacuum belt, is preferably lower than the total sum of tension inside the first vacuum belt (150) especially while printing.

The Pressure Device

The pressure device in the present embodiment is for applying a pressure against said natural leather (300) on the adhesive tape (1300) and thus second vacuum belt and also the first vacuum belt (150) of the present embodiment.

Said pressure device comprises in the present embodiment a portion for traversing said natural leather (300) with a rub by a relative movement between said pressure device and said adhesive tape (1300), carrying said natural leather (300).

The portion traverses hereby a side of the natural leather (300) wherein it moves along the surface of said side with pressure (=rub) during a period. Said period is preferably more than 50 μs. Said device for pressing the natural leather (300) on the adhesive tape (1300) is thus not a roll which is results in a very short contact pressing (≠rub). Preferably said portion is a flat portion is angled towards the second vacuum belt for example configured as a slit. The flat portion may also be a flat spring or box spring. If the portion is a flat portion, it is preferably suitable for traversing the natural leather (300) with a rub while conveying said natural leather (300) on the adhesive tape (1300). The angle between said flat portion and second vacuum belt is preferably smaller than 65°, more preferably smaller than 30°. Said angle is minimum 0.5°.

The flat portion is preferably resilient wherein said flat portion becomes (nearly) parallel with the adhesive tape (1300) of the present embodiment when said portion traverses a natural leather (300) with a rub by a relative movement between the pressure device and said adhesive tape (1300), carrying said natural leather (300). Due said resilience less scratches, caused by said portion, occur on the natural leather (300). The flat portion is preferably made of or comprising: metal, steel, polyethylene terephthalate (PET), polyamide (PA), high-density polyethylene (HDPE), polytetrafluoroethylene (PTFE), polyoxymethylene (POM) and/or Polyaryletherketone (PAEK). An end of the portion, which comes in contact with a natural leather (300) when said portion traverses the natural leather (300) with a rub by a relative movement between the pressure device and the adhesive tape (1300), is preferably rounded to prevent scratches on the natural leather (300) or comprises a soft block to shield off the sharp end of said portion.

The inkjet printer (500) preferably comprises a height regulator for adapting the distance between the portion and the first vacuum belt (150); thus second vacuum belt and adhesive tape (1300). The thickness of natural leathers may differ so said height regulator is advantageous to control the pressing of said natural leathers against the second vacuum belt. The unwoven fabric (200), especially the felt and the natural leather (300) are compressible which makes said pressure feasible.

Base Coats

The base coat applied on natural leather (300), such as crust leather provides a level of image quality commensurate to the luxury aspect of leather as the low viscosity of inkjet inks lets them penetrate rapidly into the leather resulting in a reduced image quality.

The base coat may be applied as a single layer, or may be applied as multiple layers. The multiple layers may even have a different composition for improving properties like adhesion or flexibility.

The base coat preferably includes a polymer or copolymer based on polyurethane, as this has been found to improve flexibility to the printed leather. The base coat preferably further includes a polyamide polymer or copolymer, as polyamide has been found to improve the compatibility with the crust leather and to improve the strength of the base coat. The base coat is preferably applied by spraying, but may be applied by any coating technique known, such as knife coating, extrusion coating, slide hopper coating and curtain coating. It can be applied prior to attaching the natural leather (300) to the adhesive tape (1300), if the present embodiment or it may be applied when the natural leather (300) is already attached to said adhesive tape (1300).

The base coat may be transparent, but is preferably an opaque base coat. If an opaque base coat is applied when the natural leather (300) is already attached to the adhesive tape (1300), then preferably measures are taken to either not spray or coat the area of the adhesive tape (1300) where an identifier, registration means, ruler or a positioning marker is located, or otherwise to cover them prior to spraying or coating with, for example, a removable piece of adhesive tape (1300). This way the identifier or the positioning marker can still be observed by the human eye.

The base coat may be a white base coat to enhance the colour vibrancy of the inkjet printed image, but preferably the base coat has a colour similar to that of the corium and the grain. Any desired colour may be chosen for the corium or grain and the base coat, such as red, green, brown, black, blue . . . .

Top Coats

A top coat may be applied onto the decorative image and the base coat for enhancing the scratch resistance of the decorative image.

The top coat may be applied as a single layer, or may be applied as multiple layers. The multiple layers may even have a different composition for improving properties like scratch resistance.

The protective top coat may have the same or a similar composition as the base coat. Usually the protective top coat is somewhat optimized according to the leather application. For example, flexibility does not play an important role for a leather book cover contrary to leather shoes. Hence, the protective top coat for a book cover may be optimized towards scratch resistance.

The top coat preferably includes a cross-linker and a polymer or copolymer based on polyurethane and/or polyamide.

Adhesives for the Unwoven Fabric (200)

In a less preferred embodiment, an adhesive is applied on the unwoven fabric (200), configured as second vacuum belt. To secure the holding more than only with vacuum power. The adhesive hereby forms a sticky layer on said second vacuum belt. The most preferred embodiment of the present embodiment is a second vacuum belt without said sticky layer.

Said adhesive is used for attaching the adhesive tape (1300) to the second vacuum belt of the present embodiment. The adhesive may be applied to said second vacuum belt, to the adhesive tape (1300) of to both of them.

Any adhesive known in the art can be used in the present embodiment, going from classical known adhesives to biomimic based adhesives. Repositionable adhesives are preferred, as they facilitate the process for ensuring that the leather is attached completely flat on the carrier causing no collision with the inkjet print heads. Removable pressure sensitive adhesives are also known from applications such as the Post-It™ notes from 3M.

There is no limitation on the way of applying the adhesive to a surface, which may be e.g. by coating or by spraying. Repositionable spray adhesives are preferred as they cause no or very limited damage to the corium side (370) upon separating the carrier from the leather. A commercial example of a suitable spray adhesive is the 3M™ Repositionable 75 Spray Adhesive. Spray adhesives are also known as aerosol adhesives.

Adhesive Tape (1300)

In a preferred embodiment is the adhesive tape (1300) transparent or semi-transparent and the unwoven fabric (200) comprises a register mark for easily arranging the natural leather (300) on said adhesive tape (1300). In another preferred embodiment or in combination with previous preferred embodiment the adhesive tape (1300) may comprise a register mark for easily arranging the natural leather (300) on said adhesive tape (1300). Said register mark may be marked on the adhesive side or to the opposite side if the adhesive tape (1300) is transparent or semi-transparent.

The adhesive tape (1300) is unrolled from a tape-roll. In a preferred embodiment the adhesive tape (1300) is again rolled up at the output side of the inkjet printer after decorated natural leather is detached from said adhesive tape (1300). Said rolled up adhesive tape (1300) may be reused at the input side of the inkjet printer.

The adhesive tape (1300) has preferably a width which is larger than 80% of the width of the unwoven fabric (200) and more preferably the carrier of the adhesive tape (1300) has a thickness between 10 μm and 500 μm; preferably between 10 and 300 μm. Small thickness is preferred because it results in less waste.

The adhesiveness of the adhesive side is preferably activated by pressure, thermally or applied moisture.

The adhesive side has a sticky layer which preferable comprises acrylic adhesive, epoxy resins, rubber-based adhesive, silicone adhesive, polyurethane adhesive and/or isocyanate adhesive.

Suitable carrier materials for the adhesive tape are laminates, films (for example BOPP, PO, MOPP, PP, PE, polyesters such as PET, PA, PU, PVC), foams, foamed or metallized films. The films themselves may in turn consist of several individual layers, for example, layers coextruded into a film. Preference is given to polyolefins, but also copolymers of ethylene and polar monomers such as styrene, vinyl acetate, methyl methacrylate, butyl acrylate or acrylic acid are included. It may be a homopolymer such as HDPE, LDPE, MDPE or a copolymer of ethylene with another olefin such as propene, butene, hexene or octene (for example LLDPE, VLLDE). Also suitable are polypropylenes (for example polypropylene homopolymers, polypropylene random copolymers or polypropylene block copolymers). According to the invention, it is possible to use films which have been stretched monoaxially and biaxially excellently as films. Monoaxially stretched polypropylene is characterized by its very high tensile strength and low elongation in the longitudinal direction and is used for example for the production of strapping tapes. Particular preference is given to films based on polyester, preferably polyester terephthalate, or in particular polypropylene. The film preferably has a thickness of 10 μm to 100 μm. The film can be colored and/or transparent. The film may be undrawn.

If a textile is chosen as the carrier material, all known textile carriers such as knits, scrims, tapes, braids, tufted fabrics, felts, fabrics (comprising canvas, twill and satin weave), knitted fabrics (comprising warp knitted fabric and knitwear) or nonwovens can be used as the textile support are under “nonwoven” at least textile fabrics according to EN 29092 (1988) as well as stitchbonded nonwovens and similar systems are to be understood. Also, lamination fabrics and knitted fabrics can be used.

Preferably, the adhesive applied to the carrier material is a pressure-sensitive adhesive (PSA), that is to say an adhesive which, even under relatively weak pressure, permits a permanent connection with almost all adhesive reasons and can be detached again from the primer after use essentially without residue. The adhesiveness of the adhesive is based on its adhesive properties and the removability on their cohesive properties.

In order to produce an adhesive tape from the carrier, all known adhesive systems can be used. In addition to natural or synthetic rubber-based adhesives, it is possible in particular to use silicone adhesives and also polyacrylate adhesives, preferably a low molecular weight acrylate hot melt pressure-sensitive adhesive. The adhesive can be selected from the group of natural rubbers or synthetic rubbers or from any blend of natural rubbers and/or synthetic rubbers, the natural rubber or natural rubbers basically being made of all available qualities such as Crepe, RSS, ADS, TSR. or CV types, depending on the required level of purity and viscosity, and the synthetic rubber or the synthetic rubbers from the group of random copolymerized styrene Butadiene rubbers (SBR), butadiene rubbers (BR), synthetic polyisoprenes (IR), butyl rubbers (IIR), halogenated butyl rubbers (XIIR), acrylate rubbers (ACM), ethylene vinyl acetate Copolymers (EVA) and the polyurethanes and/or their blends can be selected.

The adhesive on the carrier of the adhesive tape may be a fibrillar adhesive system, preferably emulations of adhesive systems of the toes of a beetle, fly, spider or gecko. But the emulations of setae found on the toes of geckos are most preferred for their adhesion capabilities.

The adhesion level of said adhesive on the carrier is preferably between 60 and 600 cN/20 mm adhesion to BA steel measured according to EN1939—European Committee for Standardization (CEN) and more preferably for good adhering but also for easy removing the leather between 80 and 300 cN/20 mm adhesion to BA steel, measured according to EN1939—European Committee for Standardization (CEN).

Pigmented Inkjet Inks

The one or more pigmented inkjet inks that are inkjet printed may be selected from aqueous pigmented inkjet inks, solvent based pigmented inkjet inks and radiation curable pigmented inkjet inks. However, the one or more pigmented inkjet inks are preferably one or more radiation curable inkjet ink, most preferably one or more UV curable inkjet inks.

The one or more pigmented inkjet inks preferably contain organic colour pigments as they allow for obtaining a high colour gamut on natural leather (300). Carbon black and titanium dioxide are inorganic pigments, which can be advantageously used in the present embodiment for composing black respectively white pigmented inkjet inks.

In a preferred embodiment, the one or more pigmented inkjet inks form a CMYK(W) or CRYK(W) inkjet ink set.

Other Embodiment 1

The present embodiment may be adapted for achieving the same result. The unwoven fabric (200), configured as second conveyor belt, may also be a sticky conveyor belt.

Thus a method of decorating natural leather with an inkjet printer which comprises a first vacuum belt (150) for conveying a second conveyor belt which is a sticky conveyor belt; and wherein the method comprises:

- applying from an adhesive tape-roll an adhesive tape (1300) as a continuous sheet against the sticky conveyor belt wherein said adhesive tape (1300) has an adhesive side and opposite side and the opposite side is in contact with the sticky conveyor belt;
- applying a natural leather (300) on the adhesive side of the adhesive tape (1300);
- conveying the applied natural leather by moving the first vacuum belt (150) whereby the sticky conveyor belt is moving by suction power through the first vacuum belt (150) and the applied adhesive tape (1300) is moving by the adherence to the sticky layer of the sticky conveyor belt under an inkjet print head (505);
- marking the applied natural leather with jetted droplets of the inkjet print head (505) for decorating said natural leather while the adhesive tape (1300) is attached to the sticky conveyor belt.

The sticky conveyor belt is a non-porous conveyor belt which has an adhesive side which is formed by an adhesive layer. Preferably, the adhesive applied as layer to the conveyor belt is a pressure-sensitive adhesive (PSA), that is to say an adhesive which, even under relatively weak pressure, permits a permanent connection with almost all adhesive reasons and can be detached again from the primer after use essentially without residue. The adhesiveness of the adhesive is based on its adhesive properties and the removability on their cohesive properties.

In order to produce a sticky conveyor belt from the conveyor belt, all known adhesive systems can be used. In addition to natural or synthetic rubber-based adhesives, it is possible in particular to use silicone adhesives and also polyacrylate adhesives, preferably a low molecular weight acrylate hot melt pressure-sensitive adhesive. The adhesive can be selected from the group of natural rubbers or synthetic rubbers or from any blend of natural rubbers and/or synthetic rubbers, the natural rubber or natural rubbers basically being made of all available qualities such as Crepe, RSS, ADS, TSR. or CV types, depending on the required level of purity and viscosity, and the synthetic rubber or the synthetic rubbers from the group of random copolymerized styrene Butadiene rubbers (SBR), butadiene rubbers (BR), synthetic polyisoprenes (IR), butyl rubbers (IIR), halogenated butyl rubbers (XIIR), acrylate rubbers (ACM), ethylene vinyl acetate Copolymers (EVA) and the polyurethanes and/or their blends can be selected.

The adhesive on the conveyor belt may be a fibrillar adhesive system, preferably emulations of adhesive systems of the toes of a beetle, fly, spider or gecko. But the emulations of setae found on the toes of geckos are most preferred for their adhesion capabilities.

The sticky conveyor belt may also be a sticky vacuum belt whereby the adhesive tape is also attached to the sticky vacuum belt by the suction power. The sticky conveyor belt may be an unwoven fabric (200) such as the present embodiment and its preferred embodiments but then the unwoven fabric (200) has a sticky layer on top of it.

Other Embodiment 2

The present embodiment may be adapted for achieving the same result. The unwoven fabric (200), configured as second conveyor belt may also be a conveyor belt together with the use of a double-side adhesive tape.

Thus a method of decorating natural leather with an inkjet printer which comprises a first vacuum belt (150) for conveying a second conveyor belt; and wherein the method comprises:

- applying from an adhesive tape-roll a double-sided adhesive tape (1300) as a continuous sheet against the conveyor belt wherein said adhesive tape (1300) has a first adhesive side and a second adhesive side and the second adhesive side is in contact with the conveyor belt;
- applying a natural leather (300) on the first adhesive side of the adhesive tape (1300);
- conveying the applied natural leather by moving the first vacuum belt (150) whereby the second conveyor belt is moving by suction power through the first vacuum belt (150) and the applied adhesive tape (1300) is moving by the adherence to the second conveyor belt, caused by the adherence with the second adhesive side, under an inkjet print head (505);
- marking the applied natural leather with jetted droplets of the inkjet print head (505) for decorating said natural leather while the adhesive tape (1300) is attached to the second conveyor belt.

The conveyor belt may be an unwoven fabric (200) such as the present embodiment and its preferred embodiments. The conveyor belt may also be a vacuum belt, which uses the vacuum power from the first vacuum belt.

Other Embodiment 3

The present embodiment; the 'other embodiment 1' and the 'other embodiment 2' may be adapted for achieving the same result: the adhesive tape may be configured as a conveyor belt around the second conveyor belt and thus not applied by a roll. The system is then called “a triple belt system”. Said third conveyor belt may wrapping minimum 2 gliding supports which are positioned outside the second conveyor belt. One of said gliding supports may be a pulley.

The invention claimed is:

1. A method of decorating natural leather with an inkjet printer, which comprises a first vacuum belt for conveying an unwoven fabric which is configured as a second vacuum belt, wherein the method comprises:

applying from an adhesive tape-roll an adhesive tape as a continuous sheet against the unwoven fabric, wherein said adhesive tape has an adhesive side and opposite side and the opposite side is in contact with the unwoven fabric;

applying a natural leather on the adhesive side of the adhesive tape;

conveying the applied natural leather by moving the first vacuum belt whereby the unwoven fabric is moving by suction power through the first vacuum belt and the applied adhesive tape is moving by said suction power through said unwoven fabric under an inkjet print head;

marking the applied natural leather with droplets jetted by the inkjet print head for decorating said natural leather while the adhesive tape is attached to the unwoven fabric.

2. The method of claim 1, wherein the printer comprises a device for applying pressure to the natural leather on the adhesive side of the adhesive tape.

3. The method of claim 2, wherein the device for applying pressure to the natural leather on the adhesive side of the adhesive tape comprises a portion for traversing said natural leather with a rub by a relative movement between said pressure device and said adhesive tape, carrying said natural leather.

4. The method of claim 2, wherein the unwoven fabric has an air permeability below 90 L/(dm$^2$×min).

5. The method of claim 2, wherein the unwoven fabric comprises a sticky layer for additional adhering the opposite side of the adhesive tape on said unwoven fabric (200).

6. The method of claim 2, wherein the adhesive tape comprises a sticky layer on its opposite side for additional adhering the opposite side of the adhesive tape on said unwoven fabric.

7. The method of claim 2, wherein the adhesive tape is transparent and wherein the unwoven fabric comprises a register mark for arranging the natural leather on said adhesive tape.

8. The method of claim 1, wherein the unwoven fabric has an air permeability below 90 L/(dm$^2$×min).

9. The method of claim 8, wherein the unwoven fabric is a felt.

10. The method of claim 1, wherein the unwoven fabric comprises a sticky layer for additional adhering the opposite side of the adhesive tape on said unwoven fabric.

11. The method of claim 1, wherein the adhesive tape comprises a sticky layer on its opposite side for additional adhering the opposite side of the adhesive tape on said unwoven fabric.

12. The method of claim 1, wherein the adhesive tape is transparent and wherein the unwoven fabric comprises a register mark for arranging the natural leather on said adhesive tape.

13. The method of claim 1, wherein the adhesive tape comprises a register mark for arranging the natural leather on said adhesive tape.

14. The method of claim 13, wherein the register mark is marked on the opposite side of the adhesive tape and/or the adhesive side of the adhesive tape.

15. The method of claim 1, wherein the adhesive tape is rolled up after decorated natural leather is detached from said adhesive tape and wherein the adhesive tape has a width which is larger than 80% of the width of the unwoven fabric.

* * * * *